THIN FILM NONDESTRUCTIVE MEMORY

Filed March 19, 1965

INVENTORS.
JAY M. HANSEN,
MICHAEL MAY,
BY
Robert Thompson
ATTORNEY.

INVENTOR.
JAY M. HANSEN,
MICHAEL MAY,
BY
Robert Thompson
ATTORNEY.

INVENTORS.
JAY M. HANSEN,
MICHAEL MAY,
BY
Robert Thompson
ATTORNEY.

3,448,438
THIN FILM NONDESTRUCTIVE MEMORY

Jay M. Hansen, Santa Monica, and Michael May, Los Angeles, Calif., assignors to Hughes Aircraft Company, Culver City, Calif., a corporation of Delaware Filed Mar. 19, 1965, Ser. No. 441,112
Int. Cl. G11b *5/00*
U.S. Cl. 340—174 6 Claims

ABSTRACT OF THE DISCLOSURE

A thin film nondestructive readout memory in which digital words can be written in and read out on a word-by-word basis. The writing is a rotational switching operation performed by magnetic fields generated by two intercepting current-carrying lines, one of which produces a magnetic field along the axis of anisotropy and the other of which is transverse. The reading is a ferromagnetic resonance detection operation performed by the magnetic fields generated by two intercepting zigzag, current carrying lines in which one of the zigzag lines generates an R.F. magnetic field transverse to the axis and the other line generates a D.C. magnetic field along the axis. The magnetic state of the thin film magnetic element is read out by shifting the internal magnetization with the D.C. field and detecting the resultant change in the R.F. power absorbed.

This invention relates generally to digital memories and relates more specifically to an improved thin film nondestructive readout memory.

Thin film magnetic elements can be made having anisotropic characteristics such that there is a preferred direction of magnetization called the axis of anisotropy or easy axis. These anisotropic thin films exhibit certain magnetic characteristics such as allowing reversible orientation of the magnetic remanence along the axis of anisotropy in either of two diametrically opposed directions and exhibiting ferroresonance when subjected to an externally applied magnetic field at radio frequencies.

Several characteristics of anisotropic thin film commonly associated with rotational switching techniques are that: the axis of anisotropy may be skewed, tending to tilt the axis coordinates from magnetic device to magnetic devices; the axis of anisotropy may be somewhat ambiguous or dispersed whereby the axis can be throught of as occupying an area rather than a dimensionless line; there is a tendency for domain wall motion to take place when the magnitudes of the externally applied fields are greater than the coercive force $H_c$; complete rotation of magnetization through 90° from the easy direction can be effected by applying a field equal to $H_k$ in the hard direction, whereupon the switching speed is limited to the speed of rotation of the magnetism vector $H_c$ coercive force; and domain wall motion occurs when magnetic fields exceeding the coercive force $H_c$ are applied in the easy direction of magnetization, and some wall motion may take place with magnetic fields less than $H_c$ if the hysteresis loops are not square. A more complete discussion of this property of reversible rotation can be found in Proc. of the I.R.E., January 1961, "Magnetic Film Memories Design," by J. I. Raffel, F. S. Crowther, A. H. Anderson, and T. O. Herndon, pp. 155–164.

Thin films exhibiting anisotropic magnetic characteristics also exhibit a low frequency electron spin resonance determined by the anisotropic field $H_k$ and the gyromagnetic ratio $\gamma$ of an electron spin. The resonant frequency can be changed from means of an external field applied in the easy axis direction without the field exceeding $H_c$ and thus causing nonreversible domain wall motion. The change of resonant frequency is accompanied by a change in absorption of energy near the resonant frequency.

An object of this invention is to provide a thin film magnetic memory that utilizes the above described rotational switching and ferroresonance properties in a novel manner.

Another object is to provide a thin film magnetic memory in which write-in operations and read-out operations can both be done on a word-by-word basis.

Still another object is to provide a nondestructive readout thin film memory which has the above described advantages and is tolerant of the above-described parameter limitation.

Yet another object is to provide a thin film digital memory having a high storage density without substantial stray magnetic coupling between memory elements.

A still further object is to provide a digital memory of the above type in which the memory elements are interrelated in a novel manner and can be easily and cheaply fabricated.

The above and additional objectives of this invention may be accomplished by using the rotational switching technique for write-in operations and the ferroresonance technique for read-out operations. Structurally, there is provided a superposed laminae including: a matrix array of rows and columns of anisotropic thin film memory elements; a matrix of intersecting current carrying write lines, and a matrix of intersecting current carrying read lines. All of the write lines and the read lines are electrically insulated from one another and magnetically coupled to the thin film memory elements at the intersection point of the lines so that magnetic fields generated by the current can be applied to the magnetic elements parallel to the axis of anisotropy and transverse to the axis of anisotropy.

A write operation occurs when current on a word line and on intersecting digit lines generate a magnetic field which is of sufficient magnitude to rotate the magnetization vector M of the associated thin film element into one of two possible orientations along the axis of anisotropy.

A read operation is accomplished by applying an R.F. current to all of the digit lines and a current to a selected word line, whereupon the magnetic field generated by the word line current shifts the ferroresonant characteristics of the thin film memory. As the result of this shift in ferroresonant characteristics, the amount of power absorbed by the thin film elements from the R.F. line varies, depending upon the direction of the magnetization vector M, whereupon the amount of power absorbed by the magnetic element appears as a change in attenuation on the R.F. lines and may be detected as such.

Other objects, features and advantages of this invention will become apparent upon reading the following detailed description of an embodiment and referring to the accompanying drawings in which.

Figure 3B:
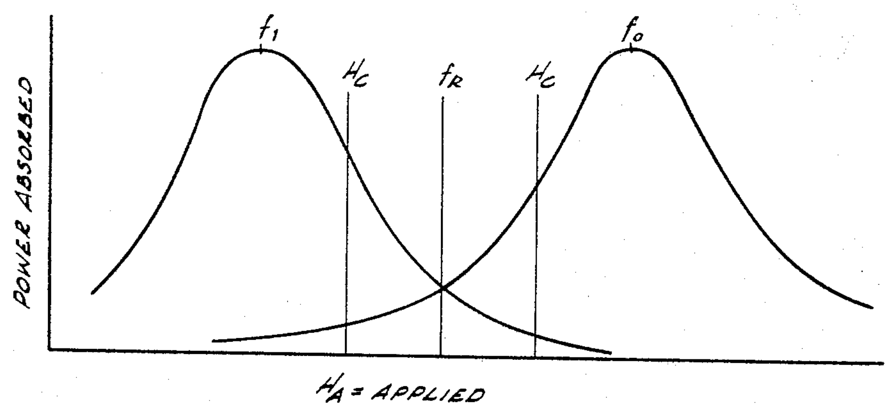
Figure 3A:
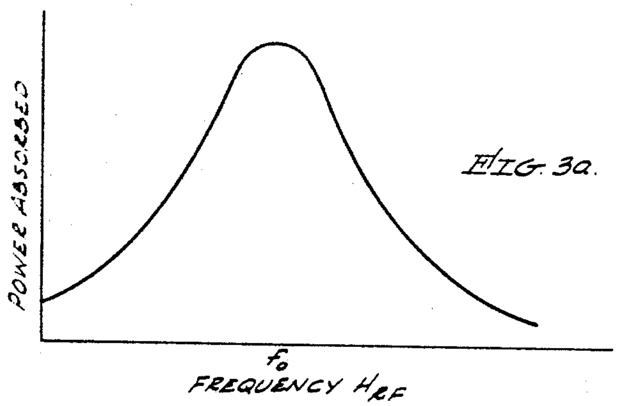
Figure 4:
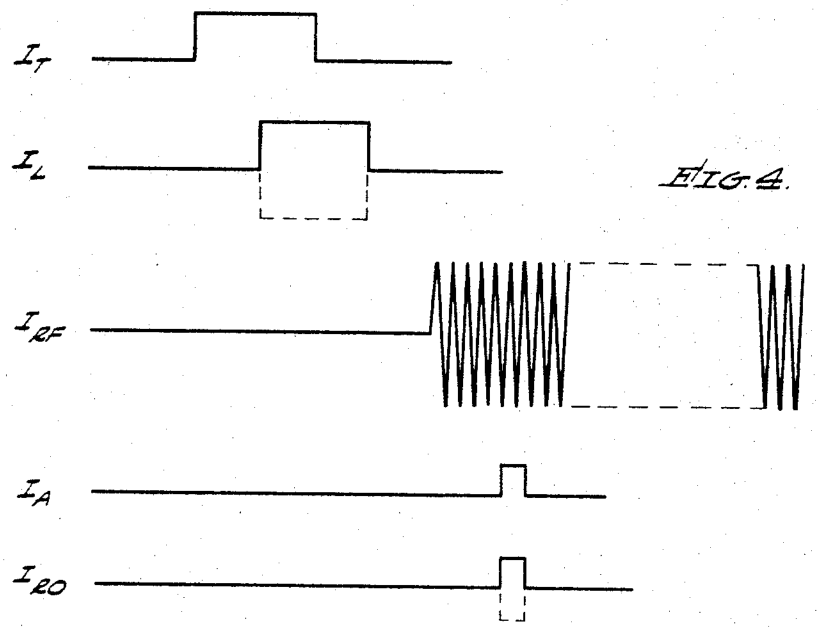
Figure 6:
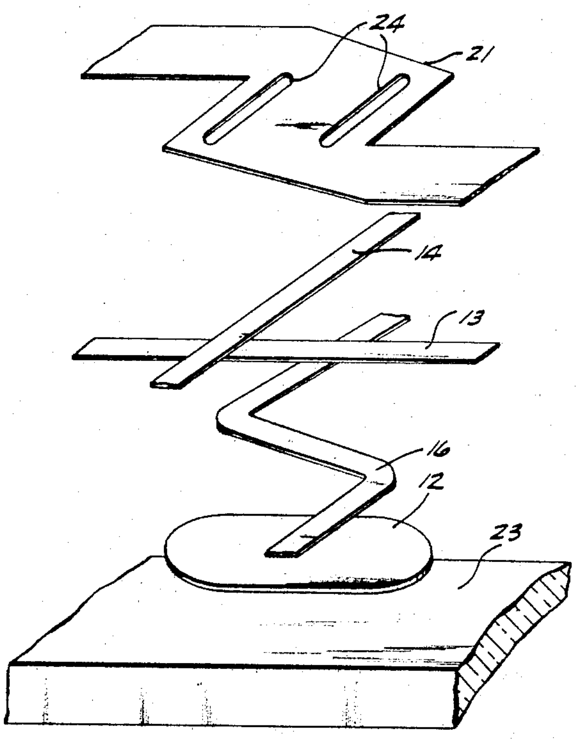
Figure 5B:
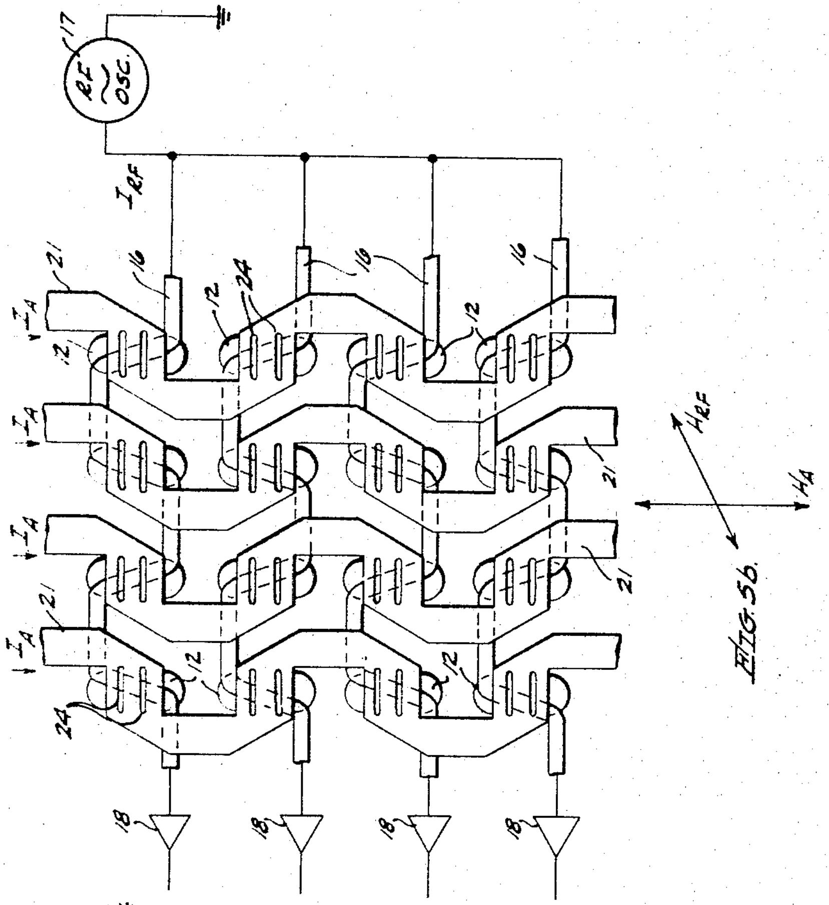
Figure 5A:
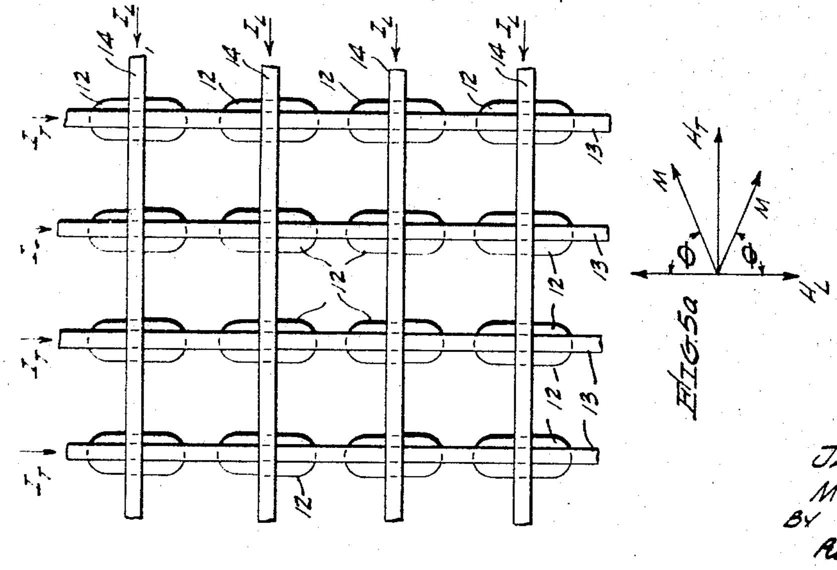

FIG. 3*a* is a graphic illustration of the energy absorbed by a thin film magnetic element versus the frequency of an externally applied radio frequency magnetic field during ferroresonance;

FIG. 3*b* is a graphic illustration of the energy absorbed versus an externally applied magnetic field;

FIG. 4 is a timing chart of representative electrical signals that can be applied to the magnetic memory for a write-in and read-out operation;

FIGS. 5*a* and 5*b* are schematic diagrams of the thin film circuitry used for write operations and for read operations, respectively; and FIG. 6 is an enlarged perspective view illustrating the stacked relationship of the individual current carrying lines relative to a thin film magnetic element.

Figure 1:
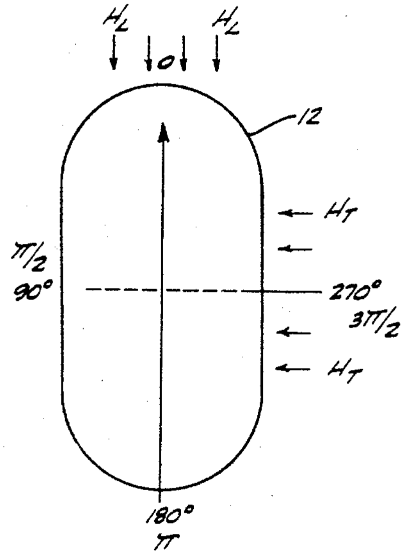
FIG. 1 is a sketch illustrating the magnetization relationships that are illustrative of reversible rotation of the remanent magnetization in a thin film magnetic element.

The property of reversible rotation of the remanent magnetization of the thin film can best be visualized by referring to FIG. 1 in which the surface of anisotropic thin film element 12 is referenced with a pair of intersecting rectangular coordinates, with the 0°–180° axis paralleling the axis of anisotropy and the 90°–270° axis traversing the axis of anisotropy at a right angle. Hereafter, the 0°–180° axis (axis of anisotropy) may also be referred to as the easy axis or the preferred axis and the 90°–270° axis may also be referred to as a hard axis.

Normally, a magnetization vector M is oriented parallel to the axis of anisotropy. When an external magnetic field $H_T$ is applied at right angles to the axis of anisotropy and parallel to the hard axis, rotation of a magnetization vector M through an angle $\theta$ is achieved as represented by the dashed line vector M to a rotation limit of $\theta=\pi/2$ radians.

When the transverse magnetic field $H_T$ is discontinued, the magnetization vector M most probably rotatably returns to an orientation along the easy axis of the film. For all angles of vector rotation substantially less than $\theta=\pi/2$ radians the magnetization vector M returns to its original state along the easy axis. For all angles of vector rotation substantially greater than $\theta=\pi/2$ radians, the magnetization vector M rotatably returns to the easy axis with the vector direction reversed $\pi$ radians from its original state along the easy axis.

When an external magnetic field $H_L$ is applied parallel to the easy axis but opposite in direction to the magnetization vector M, no rotation of the magnetization vector M will occur until the external magnetic field exceeds the internal magnetic field $H_c$, whereupon, the magnetization vector M will irreversibly switch $\pi$ radians and assume a new direction along the easy axis, which is diametrically opposed to its original direction.

As will be described in more detail later, rotation of the magnetization vector M can be achieved by a proper timing and combination of the magnetic field $H_T$ and $H_L$ whereby the coercive force $H_C$ of the thin film material is not exceeded.

The two remanent states of the magnetization vector M along the easy axis can be utilized to arbitrarily define a binary ONE and a binary ZERO, respectively, in digital storage application.

Figure 2:
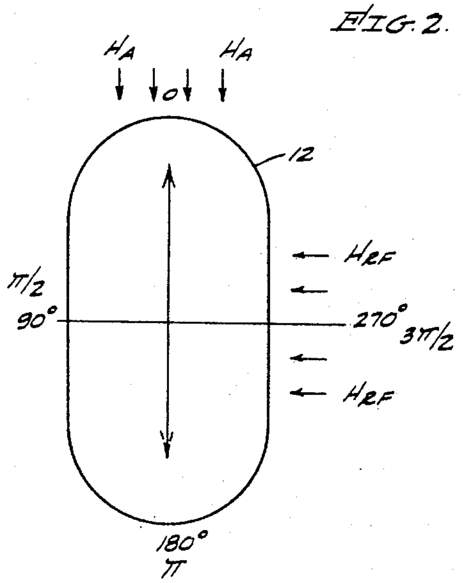
FIG. 2 is a sketch illustrating the magnetization relationships which are illustrative of ferroresonance in a thin film magnetic element.

Referring now to FIG. 2, the property of ferroresonance is exhibited when an R.F. (radio frequency) magnetic field $H_{rf}$ is applied transverse to or across the axis of anisotropy of a thin film element 12. As graphically illustrated in FIG. 3*a*, more power is absorbed by a thin film at a certain resonant frequency $f_0$ (600 mc. for example) than will be absorbed at any other frequency. The exact frequency of this resonance is influenced by the internal magnetic field of the thin film 12.

Now extending the above analysis one step further, since the internal magnetic field of the thin film is influenced by the direction of the magnetization vector M extending along the axis of anisotropy and since the magnetization vector M extends in either of two directions, it is possible to have two separate and distinct resonant frequencies for each thin film element when an external field adds or subtracts from the internal field, as illustrated graphically in FIG. 3*b*. As will be discussed in more detail later, one of these resonant frequencies $f_0$ can be arbitrarily designated to correspond to a binary ZERO store and the other resonant frequency $f_1$ can correspond to a binary ONE store.

When an external magnetic field $H_A$ is applied parallel to the easy axis to add to or decrease from the magnetization vector M, thereby changing the internal magnetic field of the thin film, the resulting change in power absorbed by the thin film can be detected as the ferroresonant characteristics of the thin film shift. For example, if the resonant frequency were at $f_0$ for a binary ZERO and the external magnetic field $H_A$ shifts the ferroresonant characteristics curve of FIG. 3*b* to the left, the change in energy absorption of the thin film would increase. Alternatively, if the resonant frequency were at $f_1$ for a binary ONE and the magnetic field $H_A$ shifts the resonant characteristics curve of FIG. 3*b* to the left, the change in energy absorption of the thin film would decrease. The main limitation on these results in that the coercive force $H_c$ of the thin film should not be exceeded by the applied magnetic field $H_A$. A more complete discussion of this ferroresonant property has been made in Proc. of the I.R.E., June 1962, "A Resonant Technique for Nondestructive Read-Out of Thin Magnetic Film" by H. D. Toombs and T. E. Hasty, p. 1526.

The above described reversible rotation operation of the remanent magnetization vector M may be implemented for write operations in the following manner. Referring to the electrical signal timing chart of FIG. 4 and the thin film circuit schematic of FIG. 5*a*, a write current $I_T$ is applied to a selected word write line or conductor 13 which is superposed to cross over the face of each thin film magnetic element 12 in a word column in a direction parallel to the axis of anisotropy. A magnetic field $H_T$ is generated by the word write current $I_T$ which is transverse to the axis of anisotropy of the thin film magnetic elements 12 in the associated word column causing the remanent magnetization vector M of each thin film magnetic element 12 to rotate through about $\pi/2$ radians from its preferred orientation parallel to the axis of anisotropy. With the magnetization vector M so rotated, currents $I_L$ are applied to digit write lines or conductors 14 which is electrically insulated from word write line 13, and cross over the face of the magnetic elements 12 at a right angle to the axis of anisotropy to generate a magnetic field $H_L$ which is parallel to or along the axis of anisotropy.

Since the vector direction of the magnetic field $H_L$ is also dependent upon the direction of the digit write current $I_L$, the resultant magnetic fields produced by a vector combination of the magnetic field $H_T$ and $H_L$ will cause the magnetization vector M to rotatably return to the axis of anisotropy in either a clockwise or counterclockwise direction. That is, if the digit write current $I_L$ is in one direction, the magnetic field $H_L$ will be oriented downward and to the left, whereupon the magnetization vector M will be biased somewhat downward and to the left. As a result, when the word write current $I_T$ is removed and the digit write current $I_L$ is removed, the magnetization vector M will rotatably return to the axis of anisotropy in a counterclockwise direction and be oriented in the downward direction. When, however, the digit current $I_L$ is in an opposite direction, the magnetic field $H_L$ will be oriented in an upward direction generating a resultant magnetic field which orients the magnetization vector M slightly upwardly. As a result, when the word write current $I_T$ is removed and the digit write current $I_L$ is removed, the magnetization vector M will rotatably return to the axis of anisotropy in a clockwise direction and be oriented in the upward direction. It should of course be understood that the above vector representations have been chosen arbitrarily and are merely intended for descriptive purposes. By first rotating the magnetization vector M off the axis of anisotropy with the transverse magnetic field $M_T$ and then tilting the magnetization vector clockwise or counterclockwise relative to the $\pi/2$ radians rotation limit prior to returning the magnetization vector M to the axis of anisotropy, only low level magnetic fields are required, thereby avoiding any need to exceed the coercive force $H_c$ of the thin film magnetic material.

With the magnetization vectors M oriented in one direction or another along the axis of anisotropy, the vector direction can be read out on a word-by-word basis by use of a ferroresonant technique. Before describing the operation of the ferroresonant technique, the downward direction of the magnetization vector M will hereafter be arbitrarily chosen as a binary ZERO and the upward direction of the magnetization vector M will be arbitrarily chosen as a binary ONE.

The previously described ferroresonant technique can be used for memory read-out operations in the following manner. Referring to the electrical signal timing chart of FIG. 4 and circuit schematic of FIG. *5b*, an R.F. current $I_{RF}$ is applied in parallel circuit relationship to a plurality of relatively thin zig zag read lines or conductors 16 which are each superposed to diagonally cross the face of all of the thin film magnetic elements 12 in an individual digit row in a serpentine manner. A magnetic field $H_{RF}$ generated by the current $I_{RF}$ flowing through the zig zag read line 16 is magnetically coupled to traverse the axis of anisotropy of the thin film elements 12 at an angle.

In the embodiment illustrated in FIG. *5b*, the traversing angle is not a right angle. Since the ferroresonant properties of the thin film are tolerant of variations in the magnetic field angle relative to the axis of anisotropy, the read operation is not unduly affected by the diagonal relationship of the read line 16.

It should be noted that all memory elements 12 are subjected to magnetic fields $H_{RF}$ at the same time from the R.F. generator 17. Although the particular frequency of the R.F. generator 17 is not critical, good ferroresonance results would probably be obtained in the vicinity of 600 mc. if $H_k$ were chosen to be 7 oersteds.

As will be explained in more detail shortly, a separate R.F. detector 18 is connected to the end of each zig zag read line 16 at the end opposite the R.F. generator connection. These detectors 18 are capable of sensing any change or variation in the radio frequency current level on each individual digit row resulting from changes in the amount of energy absorbed by an individual thin film memory element 12 in a selected word column.

Read-out of individual words on a word-by-word basis is accomplished by applying a read drive current $I_A$ to a selected one of the relatively wide zig zag read lines or conductors 21 which each cross back and forth across the thin film memory elements in a word row at a right angle to the axis of anisotropy in a serpentine manner. The read drive current $I_A$ flowing through the read drive lines 21 generates a magnetic field $H_A$ which is magnetically coupled to the thin film elements 12 parallel to the axis of anisotropy. In operation, the read drive field $H_A$ adds to or subtracts from the magnetization vector M of each magnetic element 12 depending upon which direction the magnetization vector M is oriented.

As previously discussed with reference to the rotational switching technique of the write operation the direction of the magnetization vector M is indicative of the storage state of that magnetic element or digit. Thus, by determining whether the read drive field $H_A$ adds to or subtracts from the magnetization vector M, the storage state of that cell can be nondestructively read out. This determination of vector direction is made by detecting the change in the amount of R.F. power absorbed by each digit in the selected word which appears as a change in attenuation on the R.F. read line 16 when the read drive field $H_A$ is applied to the cell.

This change in power absorption or ferroresonant operation can best be understood by referring back to FIG. *3b* in which the memory cell is illustrated as operating at below resonance. Since the read drive field $H_A$ shifts the resonance characteristic curve of that particular cell in only one direction, it is possible to determine whether the internal magnetization of the thin film magnetic element 12, as determined by the direction of the magnetization vector M, has preset the resonant frequencies of the magnetic element at either $f_1$ or $f_0$. For instance, if the read drive field $H_A$ always shifts the resonance characteristic curve to the right and if the R.F. field is at a constant frequency $f_R$ then, if the magnetization vector has present the resonant frequency, at $f_1$, the change in energy absorbed by the memory element 12 will be increasing, resulting in an increase in the attenuation detected by the associated R.F. detector 18. When, however, the magnetization vector M is in an opposite direction, the resonant frequency of the magnetic element 12 is at $f_0$ whereupon a shift of the resonance curve to the right will result in a decrease of the energy absorbed by the magnetic element 12 and a resulting decrease in the attenuation on the R.F. line 16.

It should be understood that FIGS. *5a* and *5b* should be considered as being superposed, with the current-carrying lines being positioned one on top of the other, and above one matrix of thin film magnetic element 12. With such laminate arrangement, it is necessary to electrically insulate each individual line from the other lines and from the magnetic memory element 12 while still providing sufficient magnetic coupling to the associated thin film memory element 12. One way that this could be done is illustrated in the exploded and enlarged view of the film layers as illustrated in FIG. 6. With this arrangement, the adjacent pairs of lines could be etched on opposite sides of thin glass epoxy sheets (not shown) with thin Mylar insulator (not shown) sandwiched between the adjacent faces of the sheets and the face of the thin film memory element 12.

Referring to the details of FIG. 6, the memory element 12 could be vapor deposited on a glass substrata 23. Several materials that could be used are a combination of 82% nickel and 18% iron, or a combination of nickel and iron with about 3% cobalt. The zig zag R.F. read line 16 could be copper and is positioned nearest the thin film magnetic element to provide a high degree of magnetic coupling. Next, is the word write line 13 and the digit write line 14. On the very top is the read drive line 21. Of course, other arrangements of elements are possible as long as the magnetic coupling parameters and limitations are not exceeded.

Referring now to the details of the read drive line 21, a pair of spaced-apart slots 24 are cut through the face of the material at a right angle to the axis of anisotropy to channel the read drive current $I_A$, thereby insuring that the current will cross the axis of anisotropy at substantially a right angle. Thus, the tendency for the read drive current $I_A$ to cut diagonally across the face of the magnetic element 12 is substantially reduced, whereby the read drive field $H_A$ is parallel to the axis of anisotropy, thereby increasing the reliability of the read-out operation.

While salient features have been illustrated and described with respect to a particular embodiment, it should be readily apparent that modifications can be made within the spirit and scope of the invention, and it is therefore not desired to limit the invention to the exact details shown and described.

What is claimed it:

1. A digital memory including: a plurality of thin film magnetic means, each having an axis of anisotropy and being organized in digital word groups, each word group including a plurality of said magnetic means each being operable to store a digit signal; a plurality of means each individually coupled across an individual one of said thin film magnetic means in all of the digital word groups for generating and applying a magnetic field along the axes of anisotropy; a plurality of means each individually coupled to all of the thin field magnetic means in individual digital word groups for generating and applying a magnetic field transverse to the axes of anisotropy, the magnetic fields being operable to rotate the remanent magnetization of said thin film magnetic means to a first orientation along or an opposite orientation along the axes of anisotropy; a plurality of means each individually coupled to all of the said thin film magnetic means in separate word groups for generating and applying a magnetic field along the axes of anisotropy; and means for generating an R.F. magnetic field being magnetically coupled to apply the magnetic field to all of said thin film magnetic means transverse to the axes of anisotropy wherby variations in the magnetic field applied in the direction of the axes of anisotropy varies the ferroresonant characteristics of the thin fillm magnetic means in that word group.

2. A digital memory including: a plurality of thin film magnetic means, each having an axis of anisotropy and being organized in digital word groups, each word group including a plurality of said thin film magnetic means each being operable to store a digit state; a plurality of means each individually coupled across one of the said thin film magnetic means in all of the digital word groups for generating and applying a magnetic field along the axes of anisotropy; a plurality of means each individually coupled to all of the thin film magnetic means in separate digital word groups for generating and applying a magnetic field transverse to the axes of anisotropy, the magnetic fields being operable to rotate the remanent magnetization of said thin film magnetic means to a first orientation along or an opposite orientation along the axes of anisotropy; a plurality of means each individually coupled to all of the said thin film magnetic means in separate word groups for generating and applying a magnetic field along the axes of anisotropy; means for generating an R.F. magnetic field being magnetically coupled to all of the said thin film magnetic means for applying the magnetic field to all of said thin film magnetic means transverse to the axes of anisotropy whereby variations in the magnetic field applied in the direction of the axes of anisotropy in a word group varies the ferroresonant characteristics of the thin film magnetic means in that word group; and a plurality of detector means each coupled to said means for generating an R.F. field for sensing variations in the ferroresonant characteristics of each digit in the word group.

3. A digital memory including: a plurality of thin film magnetic means each having an axis of anisotropy and being organized in groups of digital words each word group including a plurality of said thin film magnetic means and being operable to store digit states; a plurality of means for selectively generating magnetic fields being passed back and forth across each of thin film elements, each of the said means being magnetically coupled to all of the said thin film magnetic means in an individual digital word group for applying the magnetic fields along the axes of anisotropy; and second means for generating an R.F. magnetic field, said means having a plurality of members, each member being passed back and forth across the face of the said thin film magnetic means in each digital word group and being magnetically coupled thereto for applying the magnetic field to all of said thin film means transverse to the axes of anisotropy, whereby variations in the magnetic field applied in the direction of the axis of anisotropy varies the ferroresonant characteristics of the thin film magnetic means in that digital word group.

4. A digital memory including: an array of thin film magnetic means each having an axis of anisotropy and being organized in digital word groups each word group including a plurality of said thin film magnetic means each being operable to store digit states; a plurality of means for selectively generating magnetic fields, each of the said zigzag means being passed back and forth across the face of each of said thin film means in an individual digital word group and being magnetically coupled to the said thin film magnetic means in the individual digital word group for generating and applying magnetic fields along the axes of anisotropy; and a plurality of second zigzag means for generating an R.F. magnetic field, said second zigzag means each being passed back and forth across the face of a separate one of the said thin film magnetic means in all of said digital word groups and being magnetically coupled thereto for applying the R.F. magnetic field to all of said thin film means transverse to the axes of anisotropy whereby variations in the magnetic field applied along the axis of anisotropy varies the ferroresonant characteristics of the thin film magnetic means in that digital word group.

5. A digital memory including: an array of thin film magnetic means each having an axis of anisotropy and being arranged in digital word groups, each word group including a plurality of thin film magnetic means; a first plurality of means for selectively generating magnetic fields, each of the said means being passed back and forth across the face of each said thin film means in an individual word group and being magnetically coupled to the said thin film magnetic means in the individual digital word group for generating and applying magnetic fields along the axes of anisotropy; means for generating an R.F. magnetic field, said means having a plurality of elements each element being passed back and forth across the face of a separate one of the said thin film magnetic means in each digital word group and being magnetically coupled thereto for applying the R.F. magnetic field to all of said thin film means transverse to the axes of anisotropy whereby variations in the magnetic field applied along the axis of anisotropy varies the ferroresonant characteristics of the thin film magnetic means in that digital word group; and a plurality of detector means each individually coupled to a separate one of said elements of said means for generating an R.F. magnetic field for sensing variations in the ferroresonant characteristics of each digit in a word group.

6. A digital memory including: an array of thin film magnetic means each having an axis of anisotropy and being organized in groups of digital words, each word including a plurality of thin film magnetic means; a plurality of means for selectively generating magnetic fields each of the said means being passed back and forth in a serpentine manner across the face of each said thin film means in an individual word group and being magnetically coupled to the said thin film magnetic means in the individual digital word group for generating and applying magnetic fields across the axes of anisotropy; and means for generating an R.F. magnetic field, said means having a plurality of elements, each element being passed back and forth in a serpentine manner across the face of a separate one of the said thin film magnetic means in each digital word group and being magnetically coupled thereto for applying the R.F. magnetic field to all of said thin film means transverse to the axes of anisotropy whereby variations in the magnetic field applied in the direction of anisotropy varies the ferroresonant characteristics of the thin film magnetic means in that digital word group.

References Cited

UNITED STATES PATENTS

| | | | |
|---|---|---|---|
| 3,276,001 | 9/1966 | Crafts | 340—174 |
| 3,286,241 | 11/1966 | Hasty et al. | 340—174 |
| 3,289,182 | 11/1966 | Suits | 340—174 |
| 3,293,620 | 12/1966 | Renard | 340—174 |

FOREIGN PATENTS

| | | |
|---|---|---|
| 975,016 | 11/1964 | Great Britain. |

OTHER REFERENCES

T. E. Hasty: Ferromagnetic Resonance in Multidomain Thin Films, Journal of Applied Physics, vol. 35, No. 5, May 1964, pp. 1434 to 1441.

BERNARD KONICK, *Primary Examiner.*

VINCENT P. CANNEY, *Assistant Examiner.*